July 9, 1963  B. L. MIMS ETAL  3,097,027
THERMOELECTRIC COOLING ASSEMBLY
Filed March 21, 1961  3 Sheets-Sheet 1

INVENTORS
BRUCE L. MIMS
JOHN E. FITZGERALD
BY
ATTORNEY

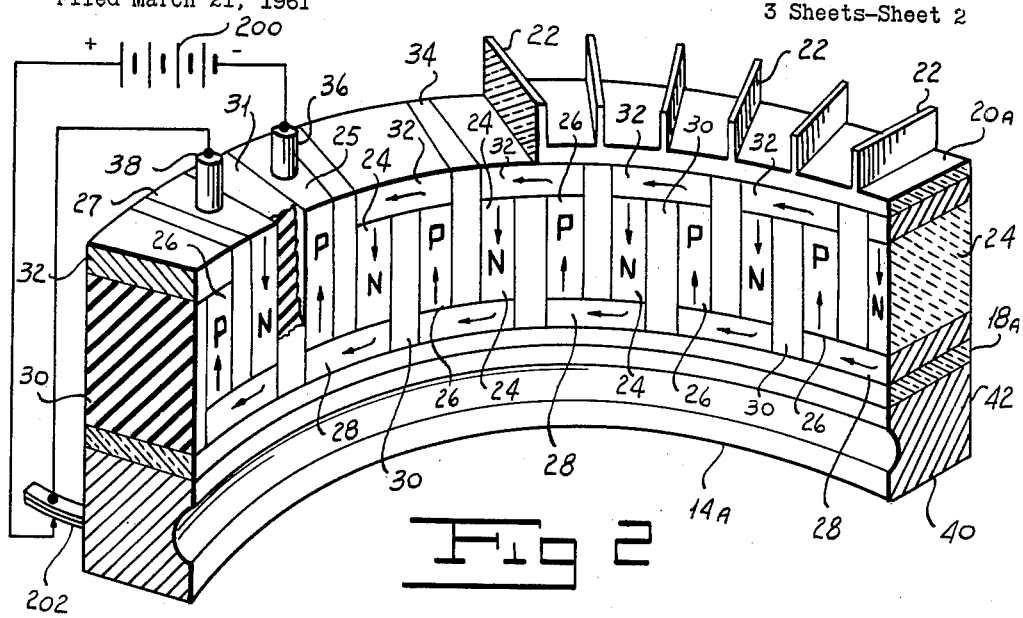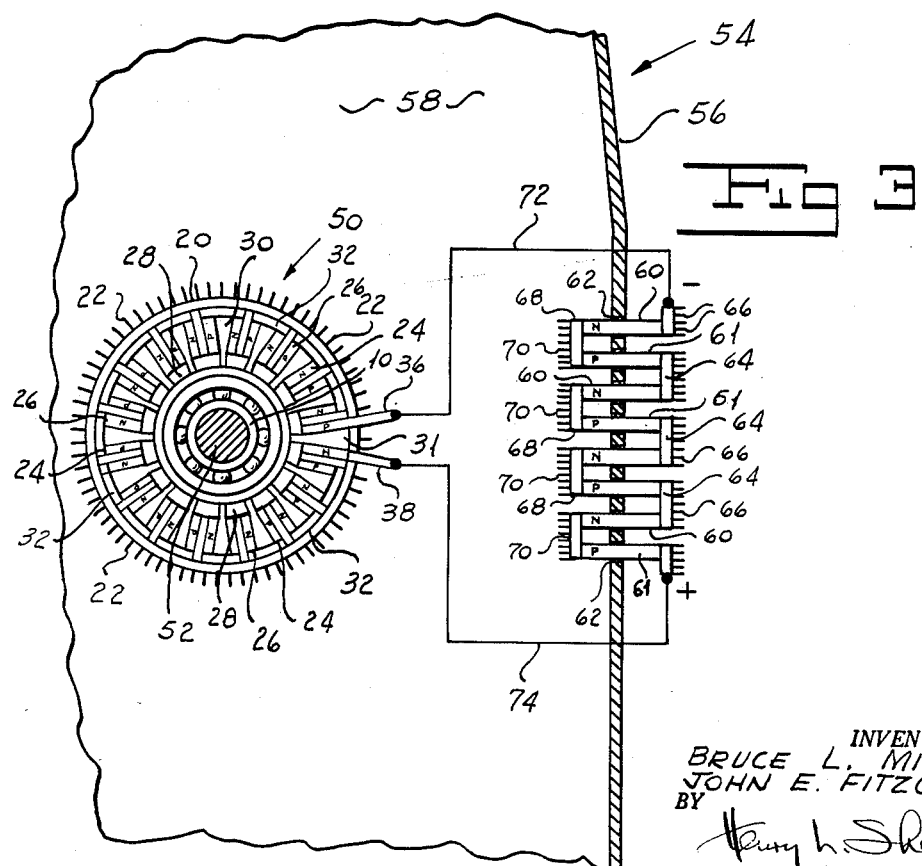

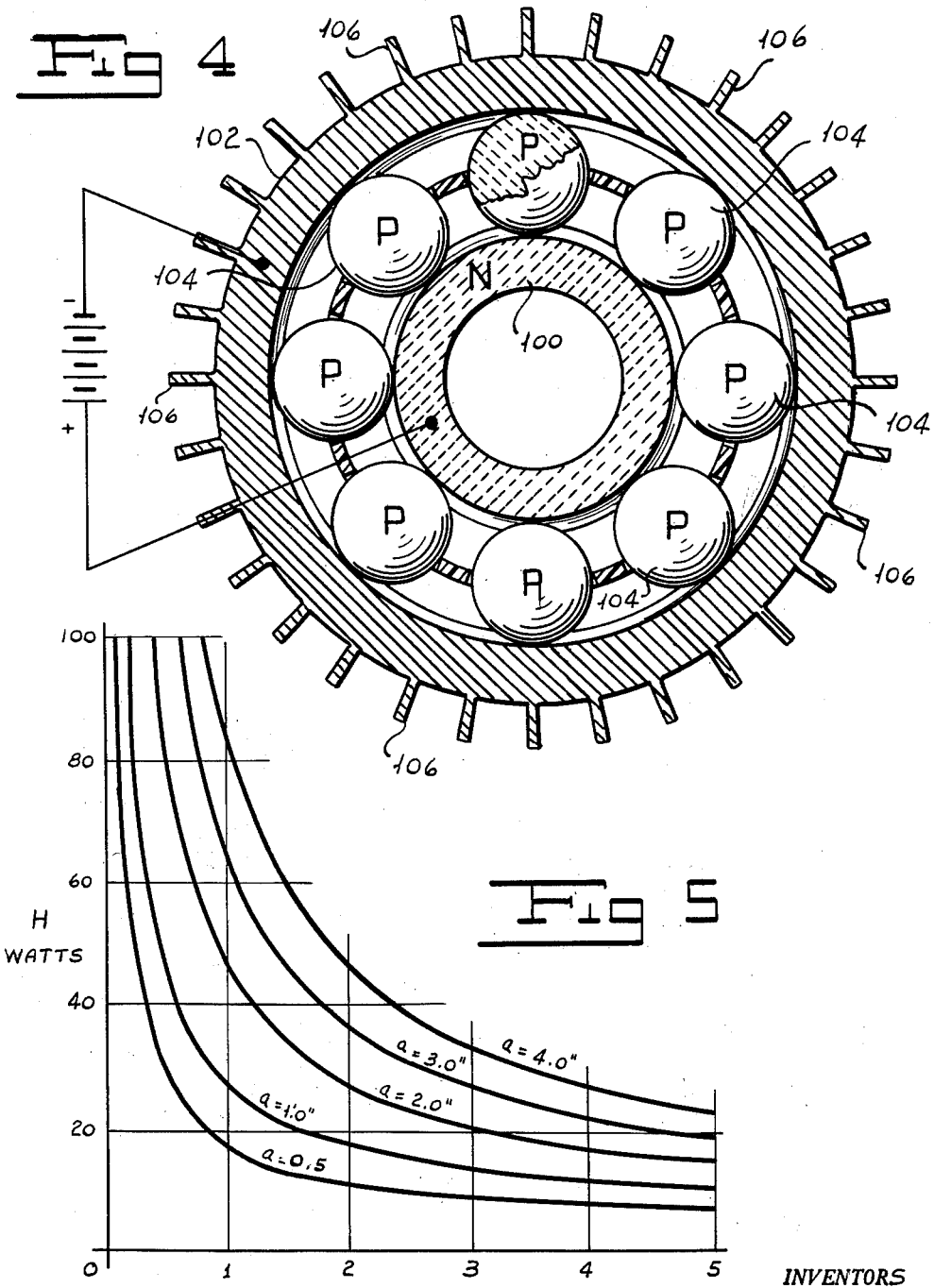

United States Patent Office 3,097,027
Patented July 9, 1963

3,097,027
THERMOELECTRIC COOLING ASSEMBLY
Bruce L. Mims, Danbury, and John E. Fitzgerald, Ridgefield, Conn., assignors to The Barden Corporation, Danbury, Conn., a corporation of Connecticut
Filed Mar. 21, 1961, Ser. No. 97,281
6 Claims. (Cl. 308—189)

Our invention relates to a thermoelectric cooling assembly and more particularly to an assembly adapted to cool rotating components such as ball bearings and the like by thermoelectric effects.

Military and space craft increasingly require that rotating equipment operate at higher temperatures. The performance of a ball bearing is so severely limited at an ambient temperature in the vicinity of 1000° F. that its operating lifetime is so shortened that ball bearings cannot be employed at these temperatures. Attempts have been made to develop bearing components and lubricants for bearings which are capable of operating even at marginal conditions at such high temperatures. These attempts have not been successful and, in general, it may be said that as far as the art is concerned it is impractical to operate a ball bearing satisfactorily at temperatures in excess of 600° F. When these temperatures are exceeded a high incident of bearing failure will occur, owing chiefly to the thermal breakdown of the lubricant and to other factors which are not well understood.

One object of our invention is to provide an assembly for cooling bearings and other rotating components which will maintain the bearings and the like at the temperature of optimum performance irrespective of variations in temperatures.

Another object of our invention is to provide a thermoelectric cooling assembly in which bearings and other rotating components are enabled to operate at temperatures in excess of 1000° F. for long periods of time.

Another object of our invention is to provide a thermoelectric cooling assembly which will enable the rotating subassembly to be automatically thermo-stabilized.

A further object of our invention is to provide a thermoelectric cooling assembly which will insulate the ball bearing aside from cooling it owing to thermoelectric effects.

Another object of our invention is to provide a thermoelectric cooling assembly for rotating components which may be switched into a heating assembly for enabling the starting of rotating devices in frigid environments.

Another object of our invention is to provide a thermoelectric cooling assembly in which bearings and other rotating components are enabled to operate for much longer periods owing to thermoelectric cooling.

Other and further objects of our invention will appear from the following description.

In general, our invention contemplates the provision of a thermoelectric cooling assembly formed of semi-conductors employing the Peltier effect constructed and arranged to pump heat from the bearings to the circumambient atmosphere. We contemplate the provision of a system in which a thermoelectric generator employing the Seebeck effect will produce the electromotive force necessary to implement the thermoelectric cooling assembly.

Seekbeck generated an electromotive force by heating the junction between dissimilar conductors. Peltier discovered that when a current is passed through the junction between two dissimilar conductors there is an absorption or generation of heat depending upon the direction in which the current is passed. The generation of heat is quite distinct from the Joule resistance heating effect incident to the passage of electric current through a conductor having resistance.

No practical use was made of these effects owing to their small magnitude until the knowledge of semi-conductors became available to the art. The use of semi-conductors greatly magnifies thermoelectric effects and enables them to be applied in a practical manner. Good semi-conductors for producing thermoelectric effects should have poor conductivity of heat; that is, it should have insulating properties. In order to make thermoelectric couples of semi-conductors, one of the elements must be of N or negative type and the other must be of P or positive type. In the manufacture of semi-conductors the provision of an impurity atom which supplies electrons in excess of those required to saturate the covalent binding scheme is called a donor impurity, and the resulting semi-conductor is the so-called N or negative type because the conductivity is primarily by negative electrons. Conversely, an impurity atom which furnishes fewer electrons than are required to complete the binding arrangement is called an acceptor impurity and the resulting semi-conductor is called P or positive type because the conduction is due primarily to positive holes. These positive and negative types of semi-conductors are well known to the art. Among the good positive thermo-elements are lead telluride, lead selenide, antimony telluride and bismuth telluride. Among the negative thermo elements are lead telluride and bismuth telluride. One of the better thermocouples may be made of positive bismuth telluride $Bi_2Te_3(p)$ with negative bismuth telluride $Bi_2Te_3(n)$.

It is understood, of course, that any desirable positive thermo-element may be combined with any desirable negative thermo-element to produce an efficient thermocouple. Positive types of germanium, silicon, indium and antimonide semi-conductor materials may be combined with negative types of semi-conductor materials.

We provide a collar or annulus formed by a battery of thermocouples of such dimensions that it may be readily placed adjacent to a rotating component which it is intended to operate at an elevated temperature. This thermoelectric cooling assembly is supplied by current from any appropriate potential source, the direction of flow of the current being such as to produce Peltier cooling adjacent the rotating component.

For purposes of convenience and not by way of limitation we shall describe our invention with respect to a ball bearing. It is to be understood, of course, that any other components such as synchros, resolvers, gyroscopes, accelerometers and the like may be cooled by means of our thermoelectric cooling assembly.

In the accompanying drawings which form part of the instant specification and which are to be read in conjunction therewith and in which like reference numerals are used to indicate like parts in the various views, FIGURE 1 is a sectional plan view of a thermoelectric cooling assembly in combination with a ball bearing.

FIGURE 2 is a fragmentary view of another form of thermoelectric cooling assembly attached to the outer race of a ball bearing.

FIGURE 3 is a diagrammatic sectional view through a missile wall showing an assembly of a thermoelectric generator employing the Seebeck effect for generating E.M.F. for energizing a thermoelectric cooling assembly for cooling a ball bearing supporting a rotating element of a missile.

FIGURE 4 is a sectional view through a ball bearing in which the rolling elements and one of the races are made of thermoelectric materials.

FIGURE 5 is a family of curves showing the heat flow as a function of cylinder diameter and the total diameter obtained by the cylinder plus the insulation at a fixed temperature difference.

Figure 1:
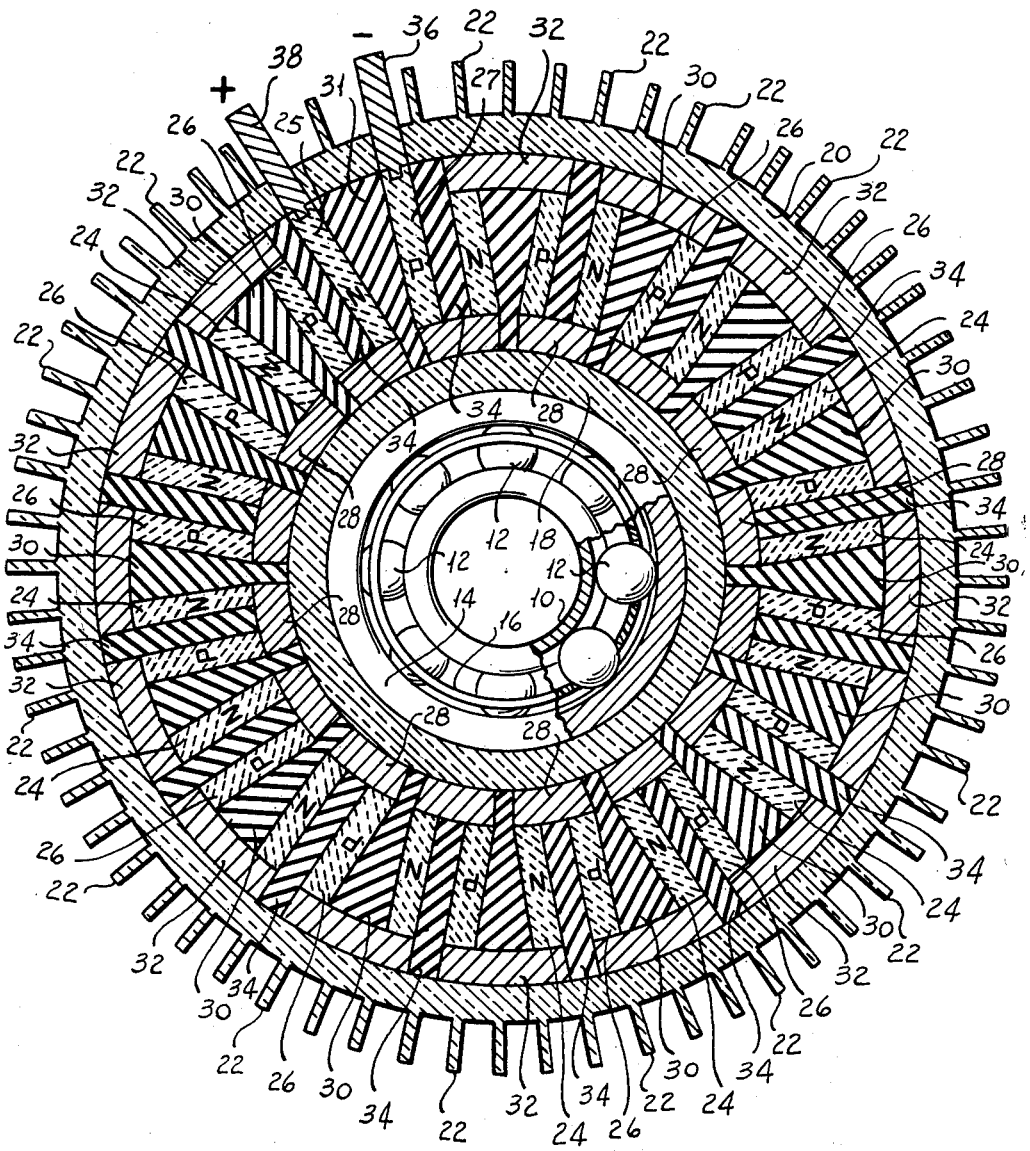

More particularly referring now to the drawings, a ball bearing inner race 10 carries a plurality of balls 12 positioned between the inner race and an outer race 14. A ball bearing retainer 16 maintains the balls in spaced condition. The thermoelectric cooling assembly for the ball bearing is positioned coaxially with and surrounding the outer race 14. Immediately adjacent the outer race 14 we position a ring of electrical insulation 18 which is adapted to conduct heat from the thermo junctions in contact therewith. The insulating ring 18 may be made of mica, glass, gypsum, marble, porcelain or quartz, all of which are comparatively good thermal conductors. Porcelain, for example, has a conductivity of .0025, that is, the number of calories of heat transmitted per second through a plate one centimeter thick across an area of one square centimeter with a temperature difference of 1° C. On the same scale, mica has a conductivity of .0018, crown glass a conductivity of .0025, flint glass a conductivity of .0020, gypsum a conductivity of .0031, marble a conductivity of .0071, porcelain a conductivity of .0025 at ordinary room temperature and at temperatures in excess of 160° F. of .0039 and quartz (parallel to axis) a conductivity of .0300.

From the foregoing it would appear that quartz is the best material to employ for the insulating ring 18 although it can be advantageously made of porcelain or glass since these materials are much more readily available and are cheaper to manufacture into the forms required.

We provide an outer ring of insulating material 20 made of material similar to that of ring 18. Advantageously, we may make the ring 18 of quartz and the ring 20 of glass or porcelain. The ring 20 is provided with a plurality of heat exchange fins 22 adapted to transfer heat from the hot junctions of the thermocouples to the circumambient atmosphere. Positioned between the outer insulating ring 20 and the inner insulating ring 18 we provide a plurality of negative thermo-elements 24 alternating with a plurality of positive thermo elements 26. The respective cold junctions adjacent the ring 18 are connected by a plurality of respective conductive segments 28. Adjacent segments 28 and adjacent thermocouples are separated by insulating segments 30, as can readily be seen by reference to FIGURE 1. The hot junctions of respective thermocouples are formed by conductive segments 32 of copper, silver, or the like similar to conductive segments 28. Adjacent segments 32 and adjacent thermocouples are separated by insulating segments 34 as can be seen by reference to FIGURE 1. It will be observed that the thermo-elements around the ring are positive thermo-elements 26 alternating with negative thermo-elements 24. The elements are connected as described. A terminal conductor 36 passes through the outer insulating ring 20 and is electrically connected to the terminal positive thermo-element 25. The insulating member 31 between the terminal thermo-elements extends between adjacent hot junctions and the terminal thermo-elements; that is, it extends between the inner ring 18 to the outer ring 20 and in this respect differs from the insulating members 30 and 34 as can readily be seen by reference to FIGURE 1. The terminal 36 is normally adapted to be connected to the negative terminal of a direct current potential source and the terminal 38 is adapted to be connected to the positive terminal of a direct current potential source. For an assembly such as is shown in FIGURE 1 comprising about three hundred thermocouples formed of bismuth telluride, an E.M.F. of twenty volts was employed which produced a current in the vicinity of five amperes. This gave a cooling effect in the vicinity of 100 watts. It will be observed that the voltage drop across a single couple is in the order of one-fifteenth of a volt. It is to be remembered that a steady state of direct current potential is required since rapid deterioration in the Peltier effect obtains for variations in voltage.

If it is desired to heat the bearing assembly as will be the case for cold starts in arctic climates, all that it is necessary to do is to reverse the polarity connecting the positive terminal of the voltage source to the terminal 36 and the negative terminal of the voltage source to the terminal 8. This can be done by a simple reversing switch. After the apparatus is started and it is desired to cool the bearing the reversing switch can be operated to reverse the polarity. This is not shown since it is well known to the art.

Referring now to FIGURE 2, we have shown a segment of a thermo-electric cooling assembly similar to that shown in FIGURE 1 except that the upper insulating ring 20A is of the same dimensions as the inner insulating ring 18A. In this form of the invention the cold junctions adjacent 18A have a larger heat exchange surface than does the insulating ring 18 shown in FIGURE 1. In the form of the invention shown in FIGURE 1, however, the thermoelectric assembly itself insulates the bearing from a hot ambient atmosphere. In the form of the invention shown in FIGURE 2 the underside 40 of the outer race 14A and the outer side 42 of this race must be insulated by separate insulating material. Other than this, as can be seen by comparing FIGURES 1 and 2, the construction of the thermoelectric cooling assembly of FIGURE 2 is the same as that shown in FIGURE 1 and like reference numerals are used to indicate like parts.

Referring now to FIGURE 3, we have shown an assembly indicated generally by the reference numeral 50 which is in all respects similar to the assembly shown in FIGURE 1 supporting a shaft 52 which forms part of the functional element in a missile indicated generally by the reference numeral 54. The skin 56 of the missile is subjected to solar radiation so that the interior 58 of the missile becomes hot. The ambient temperature in the atmosphere around the missile, however, is quite low; that is, it is cold. Furthermore, the temperature inside the missile will vary widely in its passage through outer space. In order to maintain the bearing protected by our thermoelectric cooling assembly at an operating temperature to enable shaft 52 to continue to operate even though the temperature inside the missile becomes highly elevated, it is necessary to supply potential of proper polarity to our assembly. We accomplish this by employing the Seebeck effect in conjunction with the Peltier effect. Mounted through the wall 56 of the missile 54 we provide a plurality of negative thermo-elements 60 and a plurality of alternate positive thermo-elements 61 extending through the missile wall in insulating bushings 62. The adjacent elements exterior of the missile are connected by conducting segments 64 formed of copper, silver, aluminum or the like. These form the cold junctions and are provided with heat exchange fins 66. The interior sections of adjacent thermo-elements are connected by conductors 68. These are likewise provided with heat exchange fins 70. The arrangememnt is such that the heat in the inside of the missile interior 58 will, through the operation of the Seebeck effect, create a potential of a polarity as shown in FIGURE 3. This E.M.F. is applied through conductors 72 and 74 to the terminals 36 and 38 of the assembly 50 to cool the bearing. It will be observed that the arrangement is such that the degree of cooling corresponds to the necessity for cooling. Stated otherwise, the higher the temperature the interior 58 of the missile becomes, the greater will be the cooling effect owing to the higher potential applied to the thermoelectric cooling assembly.

It will be observed that in the arrangements shown in FIGURES 1 and 2 the thermo-elements are electrically in series and thermally in parallel. The series connection prevents a high current density and thus reduces the Joule resistance heating effect. The arrangement of the elements in parallel as far as thermal conduction is concerned facilitates heat transfer and enables all the cold junctions to be adjacent to each other and all of the hot junctions to be adjacent to each other.

In order to test our assembly we built a test spindle one quarter inch in diameter and mounted it in a steel cylinder one and one half inches in diameter and three inches in length. The test spindle was surrounded by two annular thermoelectric cooling assemblies such as shown in FIGURE 1 except that only six bismuth telluride thermo-elements were used. The annular steel cylinder was interposed between the cold junctions and the outer races so that instead of cooling the outer races directly, the steel sleeve which carried the pair of bearings of the test spindle was in heat exchange contact with the inner rings 18 of the thermoelectric cooling assemblies.

In practice we need make only certain standard sizes of thermoelectric cooling assemblies and insert annular conductive bushings between the cold junctions of the thermoelectric cooling assemblies and the outer races of the ball bearings to be cooled. The thermoelectric cooling assemblies were surrounded by a blanket of glass wool insulation. Various thicknesses of insulation were applied and tested as will be pointed out more fully hereinafter. The blanketed test spindle was placed in an oven likewise insulated by glass wool insulation. The heat radiating fins 22 extended through the test spindle insulation into the ambient atmosphere of the oven. The temperature inside the oven was raised by means of resistance heating elements to a temperature of 185° F. By an application of filtered D.C. source a temperature within the test cylinder was maintained at 171° F. with a power input of about 6.8 watts. A time period of one hour and twenty minutes was required to reach the temperature difference of 14°. During the test the shaft spindle was rotated at 1800 r.p.m.

It will be seen that the foregoing test clearly demonstrates that a bearing temperature can be reduced. Actually, in this test as pointed out above, only six thermo-elements were used, three positive and three negative, and the thermo-elements which were used were bismuth telluride. For high temperature operation bismuth telluride cannot be employed since it becomes intrinsically conducting at temperatures above 200° C. Semi-conductors of the lead telluride type, however, are available and have high Z values in the neighborhood of 1000° F. These are employed for high ambient temperatures.

It is important that the D.C. power source have less than 10% ripple and it is advantageous, furthermore, to use a higher current and lower voltage. If a Seebeck generator is employed ripple-free power is, of course, automatically obtained.

A number of tests were conducted using various thicknesses of insulation and various temperatures within the testing enclosure.

Referring now to FIGURE 5, we have shown a family of curves for the heat inflow to the interior of a twelve inch cylinder. In the curves the letter $a$ represents the radius of the test cylinder; that is, the radius of the outer race of the bearing. It will be observed that a number of tests were run using bearings varying from one inch in diameter ($a=0.5''$) to bearings having an outer race diameter of eight inches ($a=4.0''$). It will be observed by reference to FIGURE 5 that the energy required for cooling dropped very sharply until an insulation blanket of about two inches was reached. After this, increasing the insulation thickness did not contribute significantly to reducing the heat flow. It will also be observed that less insulation was required for the small diameter bearing. This demonstrates that our thermoelectric cooling assembly does itself act as insulation.

It will be understood that while we have described the test with respect to bearings, our thermoelectric cooling assembly may be employed to cool any rotating components such as servomotors, control transformers, tachometer generators, resolvers, gyroscopes, synchros and the like.

The basic concepts underlying thermoelectric refrigeration are well known to the art. The effectiveness of a semi-conductor material is derived from the figure of merit, Z. This is represented by the formula $$(1) \qquad Z = \frac{a^2}{Rk}$$

in which $a$ is the Seebeck coefficient, R is the specific electrical resistivity of the semi-conductor material and $k$ is the specific thermal conductivity of the semi-conductor material.

The maximum temperature difference which can be maintained under adiabatic no load conditions may be represented by the simplified relationship $$(2) \qquad \Delta T \max = Z\frac{T_c^2}{2}$$

where $T_c$ is the Kelvin temperature of the cold junction.

The coefficient of performance ($C_p$) may be expressed by the equation $$(3) \qquad C_p = \frac{Q}{W} = \frac{T_c}{T_h - T_c} \cdot \frac{\sqrt{1+ZT_m} - \frac{T_h}{T_c}}{\sqrt{1+ZT_m}+1}$$

where Q is the heat pumped (watts), W is input (watts) $T_m$ is mean Kelvin temperature and $T_h$ is the Kelvin temperature of the hot junction.

Referring now to FIGURE 4, we construct a bearing with the inner race 100 and the outer race 102 made of N-type semi-conductor material. We construct the rolling elements 104 which may be balls as shown in FIGURE 4 or rollers, if desired, of P-type semi-conductor material. Since the inner race is of smaller diameter and enclosed, there is a smaller heat exchange surface provided. We therefore desire to maintain the inner race in a cold condition. This is done by connecting the inner race to the positive terminal of a direct current voltage source and the outer race 102 to the negative terminal of the battery. Heat will be pumped from the inner race to the outer race and the inner race will become cold while the outer race will become hot. The outer race which may be made of steel is provided with heat radiating fins 106 which may be cooled by a heat exchange medium such as cold air or circulating water. Since the inner race is not accessible and the outer race is, it will be appreciated that we have provided a novel and advantageous mode of cooling the entire bearing, namely the inner race by thermoelectric cooling and the outer race by heat exchange in a conventional fashion. It will also be observed that in FIGURE 4 the thermocouples are electrically in parallel as well as thermally in parallel. All the cold junctions are inboard, that is, at the inner race and all the hot junctions are outermost, that is, at the outer race.

Referring again to FIGURE 2, it will be observed that the voltage source, namely battery 200, is connected to the terminals 36 and 38 by means of a circuit including a thermostatic element 202. The arrangement is such that the thermostat is designed to sense the temperature of the race 40 of the bearing. When the temperature drops to a predetermined point the thermostat interrupts the cooling circuit. When the temperature rises the circuit is re-established and the cooling process again continues. We are thus enabled to set a predetermined temperature and maintain it.

It will be understood that while we have shown thermocouples arranged in series in single stages only, we may cascade thermocouples in our arrangements. By reference to Equation 3 supra it will be observed that the temperature difference obtainable from the Peltier effect for a given pair of thermocouple materials is limited. It is possible, however, to obtain greater temperature differences for cascading thermocouples. In this arrangement which is known to the art, one bank of thermocouples is used to provide a cold sink with the hot junctions of a second bank of thermocouples. This arrangement is described by B. J. O'Brien et al. in "The Journal of Applied Physics," volume 27, page 820, published in 1956. It is therefore not shown or described in detail since it is well known to the art It will be seen that we have accomplished the objects of our invention. We have provided a thermoelectrically cooled bearing which is adapted to operate at optimum temperature irrespective of variations in the ambient temperature. The cooling of a ball bearing increases its life. Thus we are enabled, for example, to provide a gyroscope for inertial guidance which may operate for periods of 25,000 to 50,000 hours since thermoelectric cooling of bearings increases bearing life.

It is well known that the limiting factor in the life of such rotating equipment is the bearing and reductions in bearing temperature result in an increase in the life of a bearing. A bearing constructed of thermoelectric materials permits thermoelectric cooling at a specific boundary as, for example, the inner race of a bearing. Owing to the reversibility of thermoelectric couples we may provide for cold starts by applying heat to the bearing when it is in frigid climates.

We may provide thermostatic controls for controlling the flow of current and by means of reversible controls maintain a bearing at a predetermined temperature irrespective of whether the ambient temperature is hot or cold.

By means of adaptors made of conductor materials such as copper, we may use a thermoelectric cooling assembly for various diameters of the elements to be cooled.

We have provided a thermoelectric cooling assembly which will enable a rotating sub-assembly to be automatically thermostabilized. Our arrangement is such that our thermoelectric cooling assembly itself insulates the ball bearing being cooled.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A thermoelectrically cooled ball bearing assembly including in combination an inner race, an outer race, rolling elements positioned between the races, a plurality of semiconductor thermocouples electrically connected in series and having first junctions positioned in heat exchange relationship with one of said races, means for impressing a direct-current potential across the terminal semiconductors of the series connected thermocouples of such polarity that said first junctions are the cold junctions of the thermocouples, said thermocouples having hot junctions and heat exchange means positioned in heat exchange relationship with said hot junctions.

2. A thermoelectrically cooled ball bearing assembly including in combination an inner race, an outer race, rolling elements positioned between the races, a plurality of semiconductor thermocouples, means for electrically connecting said thermocouples in series, said thermocouples having first junctions, means for positioning said first junctions in heat exchange relationship with one of said races, a source of direct current potential, means for impressing said direct current potential upon said series connected thermocouples in such direction that said first junctions are cold junctions, thermostatic means positioned in heat exchange relationship with one of said races, means responsive to a predetermined drop of temperature of said race for interrupting the current flow through said thermocouples, said thermocouples having hot junctions and heat exchange means positioned in heat exchange relationship with said hot junctions.

3. A thermoelectrically cooled assembly including in combination a ring, a first plurality of semiconductor thermocouples electrically connected in series and having first junctions positioned in heat exchange relationship with said ring, means for positioning said ring in a space of elevated temperature, said space being defined by a boundary wall, a second plurality of semiconductor thermocouples extending through said boundary wall between said space of elevated temperature and a space of reduced temperature, means for electrically connecting said thermocouples of the second plurality in series to provide an output voltage means for impressing said voltage upon the first series of thermocouples such that said first junctions are cold junctions.

4. A thermoelectrically cooled assembly including in combination a first ring of heat conductive electrically insulating material, a second ring of heat conductive electrically insulating material, a first plurality of semiconductor thermocouples positioned between said rings and connected in series and having first junctions positioned in heat exchange relationship with one of said heat conductive electrically insulating material rings, means for providing a heat exchange surface on the other of said heat conductive rings, means for positioning said last named ring in a space of elevated temperature, said space being defined by a boundary wall, a second plurality of semiconductor thermocouples extending through said boundary wall between said space of elevated temperature and a space of reduced temperature, means for electrically connecting said thermocouples of the second plurality in series to provide an output voltage, means for impressing said voltage upon the first series thermocouples, such that said first junctions are cold junctions.

5. A thermoelectrically cooled ball bearing assembly including in combination an inner race, an outer race, rolling elements sandwiched between the races, a first ring of heat conductive electrically insulating material disposed in heat exchange relationship with one of said races, a second ring of heat conductive electrically insulating material, a plurality of negative semiconductors positioned between said first and second heat conductive electrically insulating rings, a plurality of positive semiconductors positioned between said first and second heat conductive rings and disposed alternately with respect to said negative semiconductors, respective means for conductively connecting corresponding ends of adjacent pairs of semiconductors to form first thermocouple junctions, respective means for electrically connecting the other ends of adjacent pairs of semiconductors to form a plurality of second thermocouple junctions, the connections being such that said semiconductors are electrically connected in series, means for impressing a direct-current potential across the terminal semiconductors of the series, the polarity of the said direct-current potential being such that the first thermocouple junctions are cold junctions and means forming a heat exchange surface on said second heat conductive ring.

6. A thermoelectrically cooled bearing assembly including in combination an outer race, an inner race formed of a semiconductor material of one polarity, rolling elements positioned between said races formed of a semiconductor material of a polarity opposite to that of said inner race, means for impressing a direct-current potential across the races such that the inner race becomes the cold junctions of the thermocouples formed by the rolling elements and the inner race and means for providing a heat exchange surface upon the outer race.

References Cited in the file of this patent

UNITED STATES PATENTS

| | | |
|---|---|---|
| 2,352,206 | Kendall | June 27, 1944 |
| 2,749,716 | Lindenblad | June 12, 1956 |
| 2,959,017 | Gilman et al. | Nov. 8, 1960 |
| 2,959,925 | Frantti et al. | Nov. 15, 1960 |